United States Patent Office 3,185,722
Patented May 25, 1965

3,185,722
PHOSPHONIC AND PHOSPHINIC ACIDS AND THEIR THIO ANALOGUES CONTAINING A DICHLOROBENZYLTHIO-ETHER GROUP
Gerhard Schrader, Wuppertal-Cronenberg, Germany, assignor to Farbenfabriken Bayer Aktiengesellschaft, Leverkusen, Germany, a German corporation
No Drawing. Filed May 29, 1962, Ser. No. 198,430
Claims priority, application Germany, June 8, 1961, F 34,112
6 Claims. (Cl. 260—461)

The present invention relates to and has as its objects new and useful insecticidal phosphorus derivatives and processes for the production thereof. Generally the new compounds of this invention may be shown by the following formula

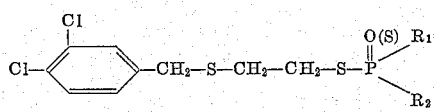

In the above formula $R_1$ and $R_2$ stand for identical or different, optionally substituted alkyl or alkoxy radicals, preferably with a carbon number of 1 to 6.

It is known that the readily obtainable 3,4-dichlorobenzylchloride can be converted by reaction with β-hydroxyethyl mercaptan into β-hydroxy-ethyl-3,4-dichlorobenzyl-thio-ether.

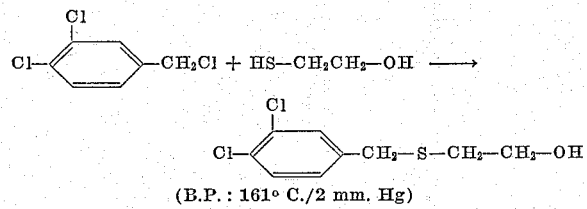

(B.P.: 161° C./2 mm. Hg)

The last mentioned product can be converted by known methods with chlorinating agents into β-chloroethyl-3,4-dichlorobenzylthioether:

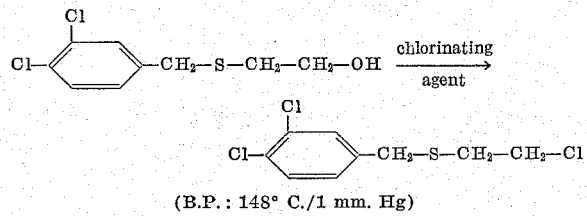

(B.P.: 148° C./1 mm. Hg)

In accordance with this invention it has now been found that the β-positioned chlorine atom of the β-chloroethyl-3,4-dichlorobenzyl thioether can easily be exchanged for the radicals of thio- or dithiophosphoric (-phosphonic, -phosphinic) acids, compounds of the above said formula thus being formed.

The process according to the invention is carried out by methods known in principle, i.e. β-chloroethyl-3,4-dichlorobenzyl thioether is reacted with salts of O,O-dialkyl (thiono)thiol-phosphoric or alkyl(thiono)thiol-O-alkyl-phosphonic or dialkyl-(thiono)thiolphosphinic acids, preferably in the presence of an inert organic solvent.

Among the salts of the aforesaid acids, alkali metal and ammonium salts are to be considered in the first place, whilst lower aliphatic ketones or nitriles, such as acetone, methyl-ethyl ketone or acetonitrile are especially suitable as solvents.

The thio- or dithiophosphoric (-phosphonic, -phosphinic) acid esters obtainable according to the process are distinguished by outstanding insecticidal properties and possess, in addition to an excellent contact insecticidal, a markedly systemic activity against a number of insect pests. Moreover, the products of the process, surprisingly, have a comparatively slight toxic action towards warm-blooded animals.

They very effectively kill insects like flies, mites, aphids, etc. They distinguish themselves especially by a good contact-insecticidal activity and at the same time by an activity on eating insects such as caterpillars.

They may be used in the same manner as other known phosphoric acid insecticides, i.e. in a concentration from about 0.00001% to about 1%, diluted or extended with suitable solid or liquid carriers or diluents.

Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

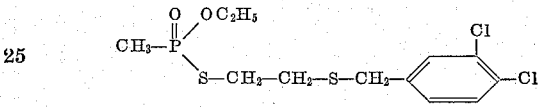

has been tested against aphids and spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against aphids of the type *Doralis fabae*. Heavily infested bean plants (*Vicia faba*) have been sprayed drip wet with solutions as prepared above and in a concentration as shown below. The effect has been determined after 24 hours by evaluation, counting the dead pests either on the surface of the soil or still remaining on the plants. The following results have been obtained:

Aphids are killed 100% by 0.001% solutions.

(b) Against spider mites. Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours and 8 days. The following results have been obtained:

Spider mites are killed 100% by 0.001% solutions.

The following examples illustrate the process as claimed.

Example 1

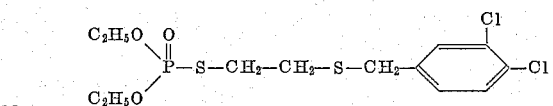

64 g. (0.33 mol) of ammonium O,O-diethylthiol-phosphate are dissolved in 200 cc. of acetonitrile. To this solution 86 g. of β-chloroethyl-3,4-dichlorobenzyl thioether are added at 80° C. with stirring, the reaction mixture is then heated to 80° C. for a further 2 hours and then poured into 400 cc. of ice water. The separated oil is taken up in 300 cc. of benzene, the benzene solution is washed with water and subsequently dried over sodium sulphate. After the solvent has been distilled off under vacuum, there remain 105 g. (81% of the theoretical) of the ester of the above constitution in form of a pale-yellow to colourless, water-insoluble oil.

*Analysis.*—Calculated for molecular weight 389: Cl, 18.3%; S, 16.4%; P, 8.0%. Found: Cl, 19.8%; S, 16.1%; P, 7.9%.

On rats per os the mean toxicity of the compound amounts to 25 mg. per kg. animal.

Example 2

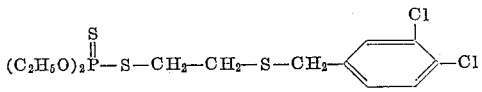

To a solution of 75 g. (0.33 mol) of potassium O,O-diethyl-thionothiol phosphate in 100 cc. of methyl-ethyl ketone there are added at 80° C. with stirring 86 g. of β-chloroethyl-3,4-dichlorobenzyl thioether, the reaction mixture is then heated to 80° C. for a further 2 hours and then poured into 200 cc. of ice water. The separated oil is taken up in 200 cc. of benzene, the benzene solution is washed with water, dried over sodium sulphate and the solvent is distilled off under vacuum. 95 g. (70% of the theoretical) of the above-mentioned ester are obtained in form of a pale-yellow, water-insoluble oil.

*Analysis.*—Calculated for molecular weight 405: S, 23.7%; P, 7.6%; Cl, 17.5%. Found: S, 22.6%; P, 7.3%; Cl, 18.0%.

On rats per os the mean toxicity of the compound amounts to 100 mg. per kg. animal.

When used in a concentration of 0.01%, the preparation still shows a 100% action against spider mites and caterpillars.

Example 3

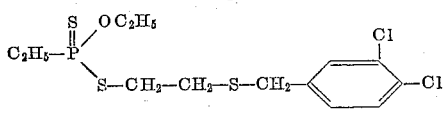

70 g. (0.33 mol) of potassium ethyl-O-ethylthionothiol-phosphonate are dissolved in 200 cc. of acetonitrile, 86 g. of β-chloroethyl-3,4-dichlorobenzyl thioether are added to this solution at 80° C. with stirring, the reaction mixture is subsequently heated to 80° C. for 2 hours and worked up as described in Examples 1 and 2. 104 g. (80% of the theoretical) of the ester of the above formula are obtained as a pale-yellow, water-insoluble oil.

*Analysis.*—Calculated for molecular weight 389: Cl, 18.2%; S, 24.6%; P, 7.9%. Found: Cl, 17.7%; S, 24.3%; P, 7.0%.

Spider mites are killed 100% by 0.001% solutions of the compound. Against ectoparasites (blowflies) the preparation is still effective in a quantity of 10 p.p.m.

Example 4

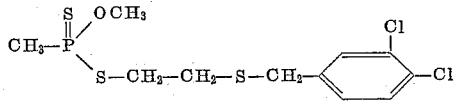

A solution of 60 g. (0.33 mol) of potassium methyl-O-methylthionothiol phosphonate in 200 cc. of acetonitrile is treated whilst stirring with 86 g. of β-chloroethyl-3,4-dichlorobenzyl thioether, the reaction mixture is subsequently heated to 80° C. for 2 hours and then worked up as described in the preceding examples. 90 g. (75% of the theoretical) of a pale-yellow, water-insoluble oil are obtained.

On rats per os the mean toxicity ($DL_{50}$) of the compound amounts to 10 mg. per kg. animal.

Aphids are killed 100% even by 0.001% solutions, caterpillars by 0.01% solutions of the ester.

Example 5

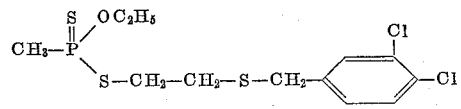

65 g. (0.33 mol) of potassium methyl-O-ethyl-thionothiol-phosphonate are dissolved in 200 cc. of acetonitrile. The resulting solution is treated at 80° C. whilst stirring with 86 g. of β-chloroethyl-3,4-dichlorobenzyl thioether, the reaction mixture is heated to 80° C. for a further 2 hours and then worked up as described in Examples 1 and 2. There are obtained 105 g. (84% of the theoretical) of the above esters in form of a pale-yellow, water-insoluble oil.

*Analysis.*—Calculated for molecular weight 375: Cl, 19.0%; P, 8.2%; S, 25.6%. Found: Cl, 19.9%; P. 7.9%; S, 24.7%.

On rats per os the mean toxicity ($DL_{50}$) of the compound amounts to 10 mg. per kg. animal.

Aphids are killed 50% by 0.001% solutions of the ester.

Example 6

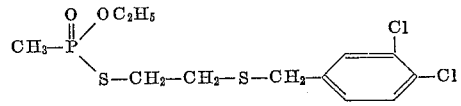

To a solution of 59 g. (0.33 mol) of potassium methyl-O-ethyl-thiolphosphonate in 200 cc. of acetonitrile 86 g. of β-chloroethyl-3,4-dichlorobenzyl thioether are added at 70 to 80° C. with stirring. The reaction mixture is then heated to 75 to 80° C. for 2 hours and then worked up as described in the preceding examples. In this manner 97 g. (81% of the theoretical) of the ester of the above formula are obtained as a yellow, water-insoluble oil.

*Analysis.*—Calculated for molecular weight 359: Cl, 19.8%; P, 8.6%; S, 17.8%. Found: Cl, 21.3%; P, 7.3%; S, 17.0%.

Spider mites and aphids are killed 100% by 0.001% solutions of the compounds. 0.1% solutions show a marked systemic action against aphids and spider mites.

Example 7

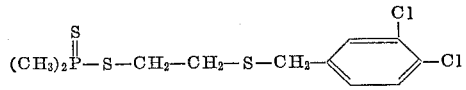

70 g. (0.33 mol) of potassium dimethylthionothiol phosphinate are dissolved in 150 cc. of acetonitrile, the solution is treated at 75° C. whilst stirring with 86 g. of β-chloroethyl-3,4-dichlorobenzyl-thioether, the reaction mixture is subsequently heated to 75 to 80° C. for a further 2 hours and worked up as described in Examples 1 and 2. In this way 102 g. (89% of the theoretical) of the ester of the above constitution are obtained in form of a yellow, water-insoluble oil.

*Analysis.*—Calculated for molecular weight 345: Cl, 20.6%; P, 9.0%; S, 27.8%. Found: Cl, 21.5%; P, 8.3%; S, 27.4%

Caterpillars are killed 100% by 0.01% solutions, aphids even by 0.001% solutions of the compound.

Example 8

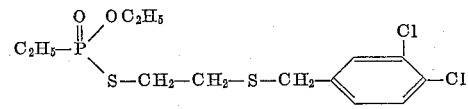

65 g. of potassium ethyl-O-ethyl-thiol-phosphonate are dissolved in 150 cc. of acetonitrile. 86 g. of β-chloroethyl-3,4-dichloro-benzyl thioether are added to the resulting solution at 80° C. whilst stirring, the reaction mixture is then heated to 80° C. for 2 hours and then worked up as described in Examples 1 and 2. 106 g. (80% of the theoretical) of the above ester are obtained as a pale-yellow, water-insoluble oil.

*Analysis.*—Calculated for molecular weight 373: Cl, 19.0%; P, 8.3%; S, 17.2%. Found: Cl, 19.8%; P, 7.8%; S, 17.2%.

Aphids and spider mites are killed with certainty by 0.001% solutions, caterpillars by 0.01% solutions.

I claim:
1. A compound of the following formula:

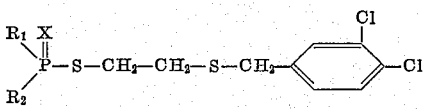

wherein $R_1$ stands for lower alkyl, $R_2$ stands for a member selected from the group consisting of lower alkyl- and lower alkoxy-radicals and X is a member of the group consisting of oxygen and sulfur.

2. The compound of the following formula

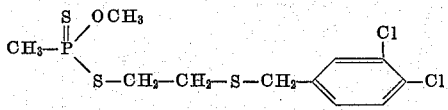

3. The compound of the following formula

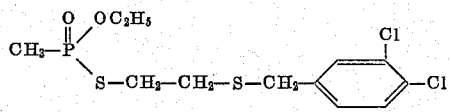

4. The compound of the following formula

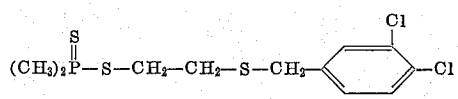

5. A compound of claim 1 wherein $R_1$ and $R_2$ are each lower alkyl.

6. A compound of claim 1 wherein $R_1$ is a lower alkyl and $R_2$ is a lower alkoxy.

References Cited in the file of this patent
UNITED STATES PATENTS 2,923,730    Schrader _____ Feb. 2, 1960
3,041,367    Leber et al. _____ June 26, 1962

FOREIGN PATENTS 1,083,811    Germany _____ June 23, 1960